United States Patent [19]
Itabashi

[11] Patent Number: 5,294,920
[45] Date of Patent: Mar. 15, 1994

[54] LIQUID CRYSTAL PANEL POSITIONING DEVICE

[75] Inventor: Tomoaki Itabashi, Tokyo, Japan

[73] Assignee: Asahi Kogaku Kogyo Kabushiki Kaisha, Tokyo, Japan

[21] Appl. No.: 944,932

[22] Filed: Sep. 15, 1992

[30] Foreign Application Priority Data

Sep. 20, 1991 [JP] Japan .................. 3-097636[U]

[51] Int. Cl.$^5$ .................................................. G09G 3/36
[52] U.S. Cl. ........................................ 345/102; 368/84; 345/50
[58] Field of Search .............. 340/784, 765; 368/67, 368/84, 242; 359/84, 85, 55

[56] References Cited

U.S. PATENT DOCUMENTS

| | | | |
|---|---|---|---|
| 3,712,047 | 1/1973 | Girard | 368/242 |
| 3,950,078 | 4/1976 | Zatsky | 368/242 X |
| 4,183,628 | 1/1980 | Laessler et al. | 368/242 X |
| 4,196,581 | 4/1980 | Nemoto | 368/242 X |
| 4,208,869 | 6/1980 | Hanaoka | 368/67 X |
| 5,008,658 | 4/1991 | Russay et al. | 340/784 |

FOREIGN PATENT DOCUMENTS

| | | | |
|---|---|---|---|
| 0313130 | 12/1988 | Japan | 340/784 |
| 0229283 | 9/1989 | Japan | 340/784 |

*Primary Examiner*—Ulysses Weldon
*Attorney, Agent, or Firm*—Sandler Greenblum & Bernstein

[57] ABSTRACT

A liquid crystal panel positioning device by which a liquid crystal panel and a light emitting panel are positioned in a liquid crystal panel holding frame. Stoppers with which the liquid crystal panel is engaged are formed at both ends of each of the side walls of the holding frame. Stoppers with which the light emitting panel is engaged are formed near the liquid crystal panel stoppers, and slightly outside of the liquid crystal panel stoppers. The liquid crystal panel and the light emitting panel are positioned by these stoppers.

6 Claims, 6 Drawing Sheets

LIQUID CRYSTAL PANEL POSITIONING DEVICE

BACKGROUND OF THE INVENTION

1. Field of the Invention

The present invention relates to a liquid crystal indicating device for indicating various kinds of information, and more particularly relates to a construction by which a light emitting part of a light emitting panel and an indicating part of a liquid crystal panel are aligned with each other.

2. Description of the Related Art

Recently, cameras having a liquid crystal panel on the camera body to indicate various kinds of photographic information or a photographic operation have been developed. The liquid crystal panel is housed in a holding frame, and a light emitting panel for supplying a back light to the liquid crystal panel, a shield plate, a liquid crystal panel driving IC, a flexible printed substrate and other elements are provided under the liquid crystal panel in the holding frame. A light emitting part of the light emitting panel is covered with a moisture-proof film. The periphery of the moisture-proof film is sealed, and electrical pole terminals are attached to an end portion of the light emitting panel.

If the light emitting part of the light emitting panel and an indicating part of the liquid crystal panel are offset from each other, the sealed portion of the moisture-proof film which is not a light emitting part is exposed in the indicating part. Therefore, in such a case, the appearance of the liquid crystal indicating device deteriorates and further, the indicating performance is degraded.

Accordingly, conventionally, the accuracy of the size of the sealed portion of the light emitting panel is strictly determined, and the light emitting panel is housed in the liquid crystal panel holding frame in such a manner that the sealed portion of the light emitting panel is not exposed in the indicating part. In this construction, however, control of the accuracy of the size of the light emitting panel sealed portion is troublesome, and sometimes, a fine adjustment of the size, such as cutting of the sealed portion, is needed, and therefore, assembly of the liquid crystal indicating device becomes complicated.

SUMMARY OF THE INVENTION

Therefore, an object of the present invention is to provide a liquid crystal panel positioning device in which, when the light emitting panel for supplying a back light to a liquid crystal panel is mounted in the holding frame, the light emitting panel is exactly positioned at a predetermined position, so that the indicating part of the liquid crystal panel and the light emitting part of the light emitting panel are properly aligned.

According to the present invention, there is provided a liquid crystal panel positioning device comprising a liquid crystal panel for indicating information, a light emitting panel provided for supplying a back light to the liquid crystal panel, a first positioning mechanism, and a second positioning mechanism. The first positioning mechanism positions the liquid crystal panel at a predetermined position. The second positioning mechanism positions the light emitting panel at a predetermined position, and is provided at a position different from the first positioning mechanism.

Further, according to the present invention, there is provided a liquid crystal panel positioning device comprising a liquid crystal panel for indicating information, a light emitting panel for supplying a back light to the liquid crystal panel, and a holding frame provided for holding the liquid crystal panel and the light emitting panel. The holding frame has a first stopper with which the liquid crystal panel is engaged, and a second stopper with which the light emitting panel is engaged, whereby a light emitting portion of the light emitting panel and a liquid crystal indicating portion of the liquid crystal panel are aligned with each other.

Furthermore, according to the present invention, there is provided a liquid crystal panel positioning device including a liquid crystal panel for indicating information, a light emitting panel for a back light to the liquid crystal panel, and a holding frame provided for holding the liquid crystal panel and the light emitting panel. The device includes a first stopper formed in the holding frame, and a second stopper formed outside of the first stopper in the holding frame. The liquid crystal panel and the light emitting panel enage the first stopper and second stopper, respectively, whereby an indicating part of the liquid crystal panel and a light emitting part of the light emitting panel are aligned with each other.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
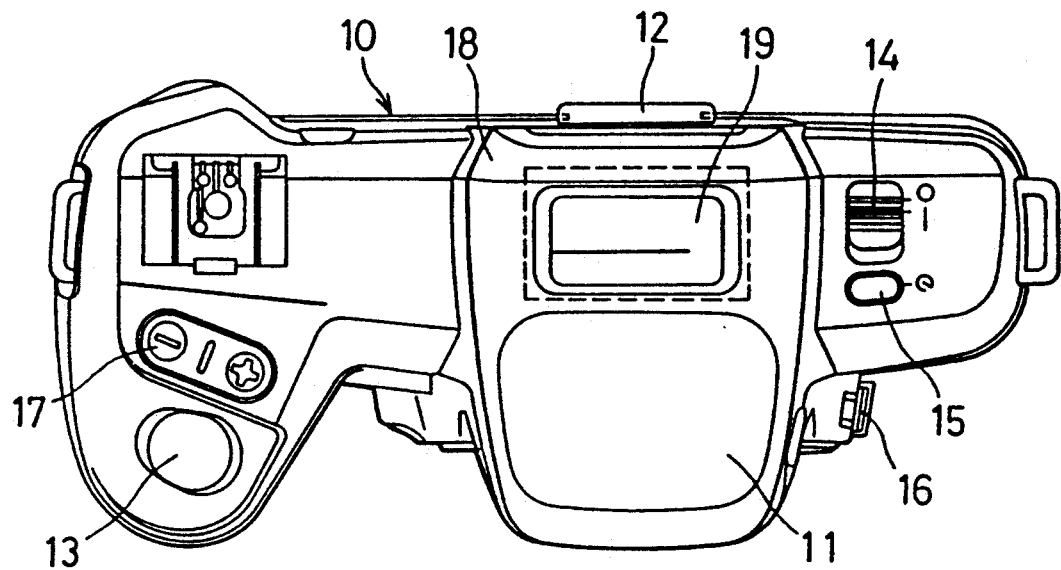
FIG. 1 is a plan view showing a camera body having a liquid crystal indicating device according to an embodiment of the present invention.

The present invention will now be described with reference to embodiments shown in the drawings.

Figure 2:
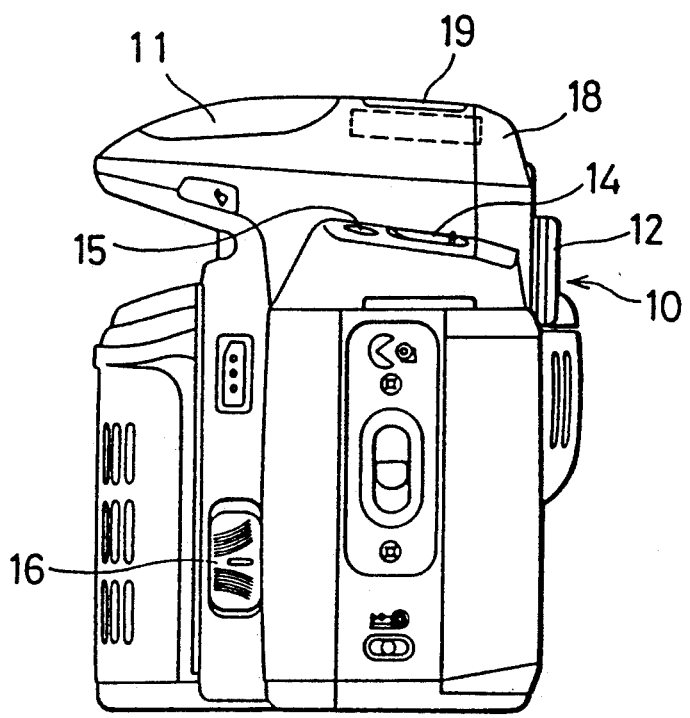
FIG. 2 is a side view of the camera body shown in FIG. 1.

FIGS. 1 and 2 show a camera body 10 having a liquid crystal indicating device according to an embodiment of the present invention.

The camera body 10 is provided with operation parts such as a flash cover 11 for covering an electronic flash installed in the camera body 10, a view finder 12, a shutter release button 13, an electric source switch 14, a self timer button 15, a focusing mode selecting lever 16, and an exposure control button 17. A top cover 18 projects upward at a central portion of the camera body 10, and is provided with a liquid crystal indicating panel 19, by which information, useful for photographic operations, such as adjusting exposure conditions, a film winding operation, a film rewinding operation, a self timer and the like, is indicated.

Figure 3:
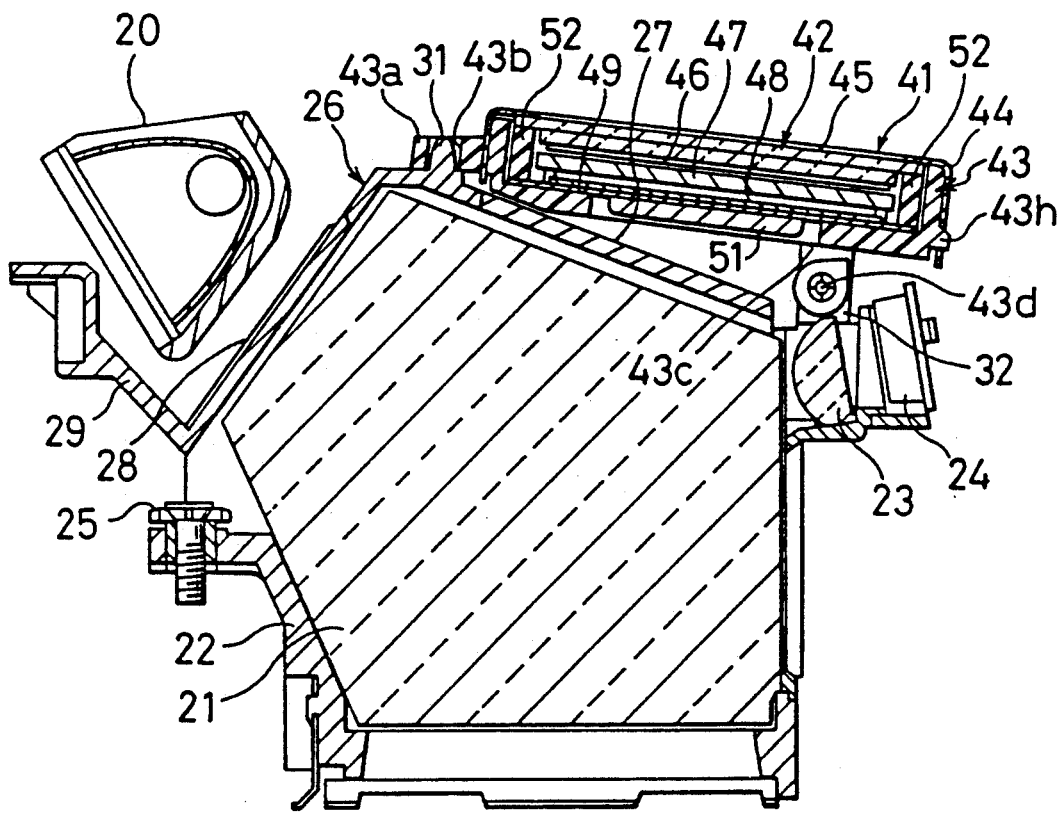
FIG. 3 is a sectional view showing an upper part of the camera body.

FIG. 3 shows an upper part of the camera body 10. A pentagonal prism 21 is held in a prism holder 22, and a focusing screen (not shown) is disposed under the pentagonal prism 21. An eyepiece (not shown) of the view finder 12 is disposed near an outlet surface of the pentagonal prism 21, whereby an object image can be observed by the view finder 12. A photometry lens 23 and a photo sensor 24 are provided at an upper side of the eyepiece. It is noted that, the prism holder 22 is fixed to a front block (not shown) of the camera body 10 by a screw 25.

An object image reflected by a reflection mirror housed in the camera body 10 is formed on the focusing screen disposed under the pentagonal prism 21. The beam forming the object image is reflected by the pentagonal prism 21, and led to the eyepiece and the photometry lens 23. The beam reflected by the pentagonal prism 21 is converged through the photometry lens 23, and thus the intensity of the beam is sensed by the photo sensor 24. This sensed beam intensity is converted to an electrical signal, and transmitted to an exposure control unit (not shown) to be used for exposure control.

A prism cover 26 is disposed on an upper portion of the pentagonal prism 21. The prism cover 26 has a first slant portion 27, which is inclined backward, and a second slant portion 28, which is inclined forward, which correspond to an upper surface of the pentagonal prism 21. A raised portion 29 is formed on the front end of the second slant portion 28. An electronic flash 20 is positioned between the second slant portion 28 and the raised portion 29 in a retracted condition, and supported by an arm mechanism (not shown), so that the electronic flash 20 is rotated upward and downward in association with opening and closing operations of the flash cover 11.

An engaging pin 31 for fixing a liquid crystal panel unit 41 is provided on a peak portion between the first and second slant portions 27 and 28. A support portion 32 is provided on a rear end portion of the prism cover 26 to rotatably support the liquid crystal panel unit 41, which is disposed on a portion close to the first slant portion 27 of the prism cover 26.

Figure 4:
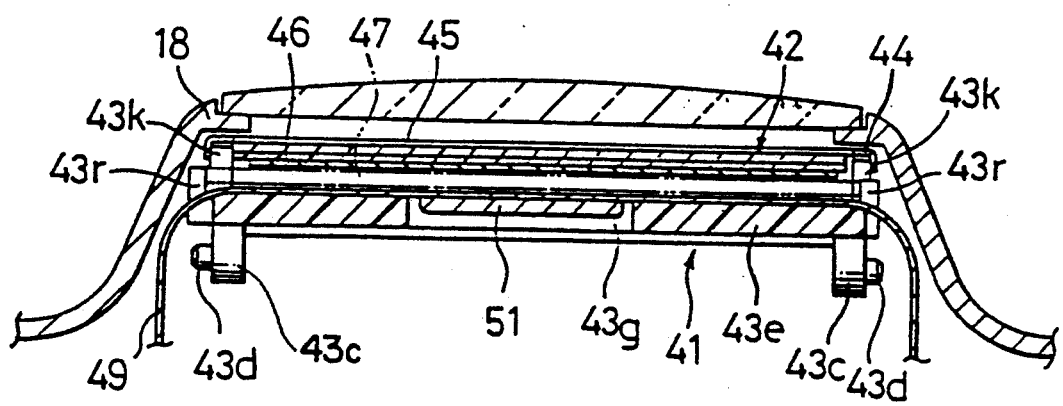
FIG. 4 is a sectional view showing a liquid crystal panel unit of the embodiment.
Figure 5:
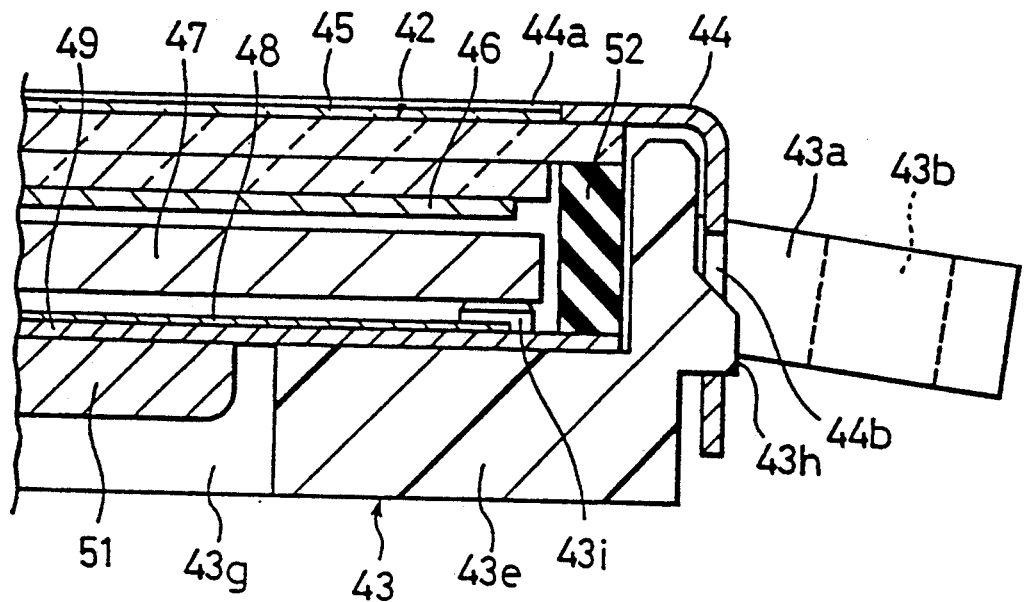
FIG. 5 is an enlarged sectional view showing a main part of the liquid crystal panel unit.
Figure 6:
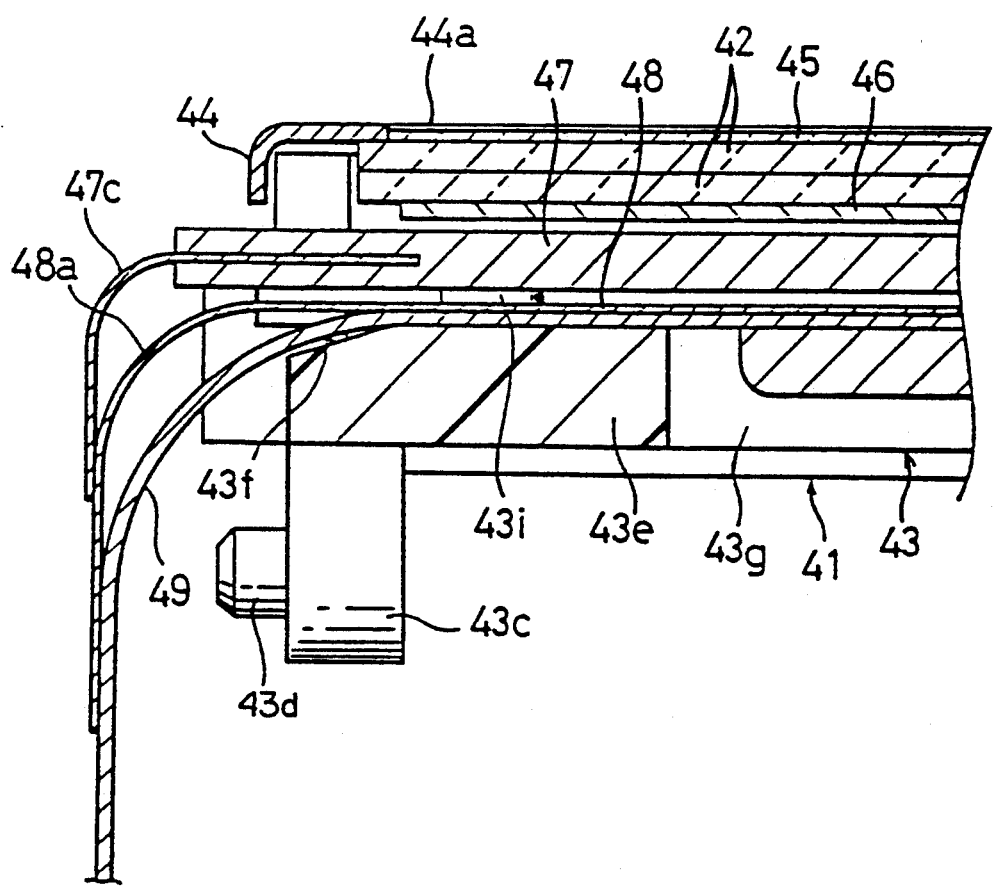
FIG. 6 is an enlarged sectional view of a main part of FIG. 2.

As shown in FIGS. 4 through 6, the liquid crystal panel unit 41 has a liquid crystal panel 42 held in a liquid crystal panel holding frame 43 by a liquid crystal panel cover 44. A polarizing plate 45 is disposed on a top face of the liquid crystal panel 42, and a reflection plate 46 is placed on a back face of the liquid crystal panel 42. The reflection plate 46 is constructed in such a manner that light coming from a back side of the reflection plate 46 passes therethrough, and in particular is a light radiated from a light emitting panel 47 passing through the reflection plate 46 to reach the liquid crystal panel 42. The light emitting panel 47 provided for supplying back light to the liquid crystal panel 42, a shield plate 48, a flexible printed substrate 49 and an IC 51 are disposed under the reflecting plate 46 in turn. The shield plate 48 is provided for shielding against noise generated by the light emitting panel 47. The flexible printed substrate 49 and the IC 51 are provided for driving the liquid crystal panel 42.

The flexible printed substrate 49 is placed on a bottom 43e of the liquid crystal panel holding frame 43, and the shield plate 48 is placed on the flexible printed substrate 49. Conductive rubber elements 52 are fixed on edge portions of the flexible printed substrate 49 as shown in FIG. 5. The liquid crystal panel 42 has a pair of glass sheets, an upper one of which is supported by the conductive rubber elements 52. The light emitting panel 47 is supported by spacer pins 43i which are formed on the bottom 43e and extend through the flexible printed substrate 49, so that a gap is formed between the light emitting panel 47 and the shield plate 48. The IC 51 is housed in a space 43g formed in the bottom 43e, and provided on a back face of the flexible printed substrate 49.

The liquid crystal panel holding frame 43 is a rectangular frame, and is provided with horizontal projections 43a at the front end portion thereof. Each of the horizontal projections 43a has an engaging hole 43b corresponding to the engaging pin 31 of the prism cover 26. Vertical projections 43c are formed at the rear end of the lower surface of the liquid crystal panel holding frame 43, and a support pin 43d is formed on each of the vertical projections 43c.

Figure 7:
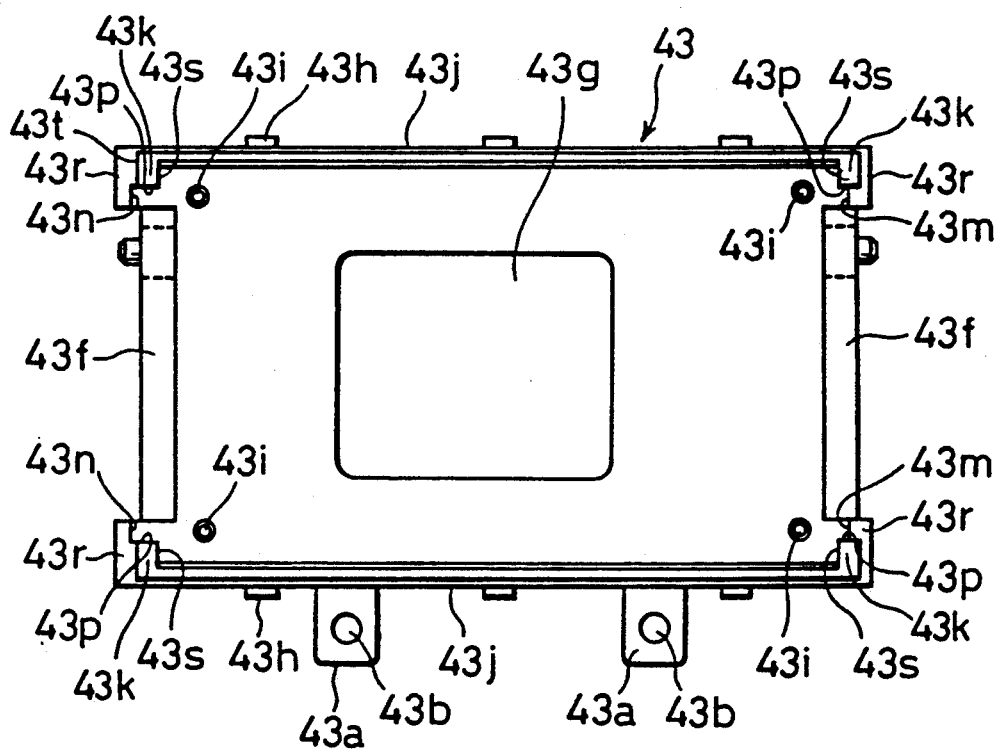
FIG. 7 is a plan view showing a liquid crystal panel holding frame.

As shown in FIG. 7, the liquid crystal panel holding frame 43 has side walls 43j corresponding to long sides of a rectangular shape. Liquid crystal panel stoppers 43k are formed at both ends of each of the side walls 43j (i.e., four corners of the rectangle), and light emitting panel stoppers 43r are formed near the liquid crystal panel stoppers 43k. As shown in FIG. 4, the light emitting panel stoppers 43r are shorter than the liquid crystal panel stoppers 43k. As shown in FIG. 7, the light emitting panel stoppers 43r positioned at the right side in FIG. 7 have inner stopper surfaces 43m which are located slightly outside of the inner surfaces 43s of the liquid crystal panel stoppers 43k positioned at the right side. The light emitting panel stoppers 43r positioned at the left side in FIG. 7 have inner stopper surfaces 43n which are located slightly outside of the outer surfaces 43t of the liquid crystal panel stoppers 43k positioned at the left side.

The holding frame 43 is provided with guide portions 43f at both end portions of the bottom 43e. Each of the guide portions 43f is a flat surface, and the flexible printed substrate 49 is extended along the guide portions 43f as shown in FIG. 6. The guide portions 43f are inclined outwardly and downward, whereby the flexible printed substrate 49 is smoothly bent.

Figure 8:
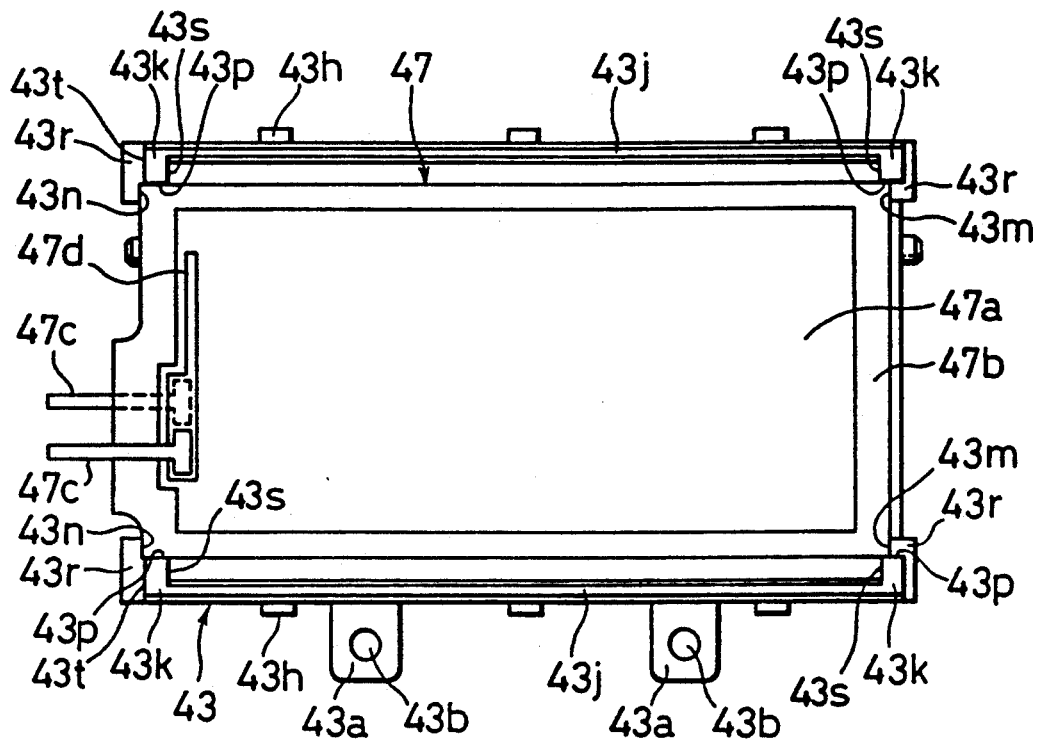
FIG. 8 is a plan view showing a state in which a light emitting panel is mounted on the liquid crystal panel holding frame.

As shown in FIG. 8, the light emitting panel 47 has a plate shape corresponding to the liquid crystal panel 42, and is constructed such that the light emitting panel is covered with transparent moisture-proof film and the peripheral portion is sealed. Therefore, in the light emitting panel 47, a light emitting part 47a is provided on the central portion, and a non-light emitting part 47b is provided on the peripheral portion (the sealed portion). On one side of the light emitting panel 47, conductive strips 47d are attached on the upper and lower surfaces of the panel 47, and electrical terminals 47c are in contact with the conductive strips 47d.

The short sides of the rectangular shape light emitting panel 47 are in contact with the inner stopper surfaces 43m and 43n of the light emitting panel stoppers 43r, and the long sides of the light emitting panel 47 are in contact with side stopper surfaces 43p of the liquid crystal panel stoppers 43k, whereby the light emitting panel 47 is positioned. Since the inner stopper surfaces 43n are located slightly outside of the outer surface 43t of the liquid crystal panel stopper 43k, the light emitting panel 47 is mounted on the liquid crystal panel holding frame 43 in such a manner that the side on which the electric terminals 47c are provided is positioned slightly outside in comparison with the other side of the light emitting panel 47.

It is noted that, each of the side stopper surfaces 43p is approximately perpendicular to the inner surfaces 43s of the liquid crystal panel stoppers 43k. That is, the light emitting panel 47 engages the side stopper surfaces 43p, which are formed on the liquid crystal panel stopper 43k and other than the inner surface 43s with which the liquid crystal panel 42 is engaged as described below.

As shown in FIG. 6, an end portion 48a of the shield plate 48 is connected to the flexible printed substrate 49, and the electric terminals 47c are connected to the end portion 48a of the shield plate 48.

The liquid crystal panel 42 on which the polarizing plate 45 and the reflection plate 46 are provided above the light emitting panel 47, form a space between the reflection plate 46 and the light emitting panel 47. The space is defined by the conductive rubber elements 52.

Figure 9:
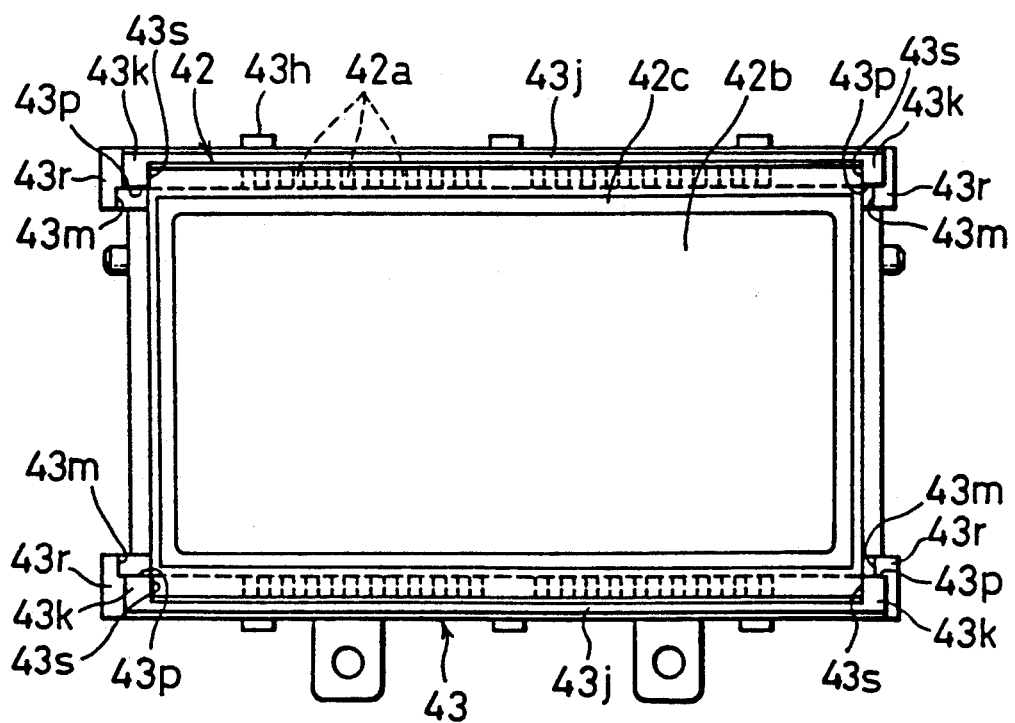
FIG. 9 is a plan view showing a state in which the liquid crystal panel is mounted on the liquid crystal panel holding frame.

As shown in FIG. 9, the liquid crystal panel 42 is provided with a plurality of contact portions 42a projecting from both ends thereof. The liquid crystal panel 42 and the flexible printed substrate 49 are electrically connected to each other through the conductive rubber elements 52. It is noted that, the liquid crystal panel 42 has a liquid crystal indicating part 42b on the center thereof, and a nonindicating part 42c on the periphery thereof which is not used for indication.

Four corners of the liquid crystal panel 42 are engaged with the liquid crystal panel stoppers 43k. In particular, the short sides of the liquid crystal panel 42 engage the inner surfaces 43s of the liquid crystal panel stoppers 43k, and the long sides of the liquid crystal panel 42 engage the side walls 43j, whereby the liquid crystal panel 42 is positioned. In this state, the liquid crystal indicating part 42b of the liquid crystal panel 42 and the light emitting part 47a of the light emitting panel 47 are aligned with each other.

The liquid crystal indicating device described above is assembled as foolows.

First, the liquid crystal panel 42 on which the polarizing plate 45 and the reflection plate 46 are provided is mounted on the liquid crystal panel holding frame 43. Then, engaging openings 44b formed in the liquid crystal panel cover 44 are engaged with claws 43h formed on outer surfaces of the holding frame 43 as shown in FIG. 5. As a result, the periphery of the polarizing plate 45 engages a periphery of a window 44a formed in the liquid crystal panel cover 44, whereby the liquid crystal panel 42, the light emitting panel 47, the shield plate 48, the flexible printed substrate 49 and the other elements are held in the liquid crystal panel holding frame 43.

Then, the support pin 43d of the liquid crystal panel holding frame 43 is rotatably connected to the support portion 32 of the prism cover 26, and the engaging hole 43b engages the engaging pin 31, whereby the liquid crystal panel unit 41 is fixed to the prism cover 26. The top cover 18 is mounted on the outside of the liquid crystal panel unit 41 as shown in FIG. 4.

As described above, according to the embodiment, due to the liquid crystal panel stoppers 43k and the light emitting panel stoppers 43r, the liquid crystal indicating part 42b of the liquid crystal panel 42 and the light emitting part 47a of the light emitting panel 47 are aligned with each other. Therefore, the non-light emitting part 47b of the light emitting panel 47 is not exposed in the liquid crystal indicating part 42b of the liquid crystal panel 42, and thus, in the liquid crystal indicating device of the embodiment, a satisfactory indication is obtained, and the appearance is improved. Further, in comparison with a conventional device, since a high degree of accuracy in the size of the light emitting panel sealed portion (i.e., non-light emitting part) is not needed, and a fine adjustment of the size is also not needed, the cost for assembling the liquid crystal indicating device is lowered and the assembly process is simplified.

The above embodiment is merely one example. That is, shapes of the light emitting panel stoppers 43r and the liquid crystal panel stoppers 43k can be freely changed. Further, although the liquid crystal panel of the above embodiment is mounted on an upper portion of the view finder of the camera body, the present invention can be applied to a liquid crystal panel disposed on an upper face of a grip portion of a camera body, for example. Furthermore, the present invention can be applied to a liquid crystal panel provided on a photographic device such as a video camera, or an audio device such as a tape recorder.

Although the embodiments of the present invention have been described herein with reference to the accompanying drawings, obviously many modifications and changes may be made by those skilled in this art without departing from the scope of the invention.

The present disclosure relates to subject matter contained in Japanese Utility Model Application No. 3-97636 (filed on Sep. 20, 1991) which is expressly incorporated herein by reference in its entirety.

I claim:

1. A liquid crystal panel positioning device comprising:
    at least two stopper portions, each stopper portion having a first stopper surface and a second stopper surface, said first stopper surface and said second stopper surface forming a corner having a predetermined angle;
    a liquid crystal panel;
    a light emitting panel provided for supplying back light to said liquid crystal panel, said light emitting panel being disposed under said liquid crystal panel, so that a first side of said liquid crystal panel and a first side of said light emitting panel form a corner, said first side of said liquid crystal panel engaging a said first stopper surface to be fixed at a predetermined position, and said first side of said light emitting panel engaging a said second stopper surface to be fixed at a predetermined position;
    each said stopper portion further including a third stopper surface forming a predetermined angle with a said first stopper surface and a fourth stopper surface forming a predetermined angle with a said second stopper surface, said liquid crystal panel having a second side forming a predetermined angle with said first side of said liquid crystal panel, said light emitting panel having a second side forming a predetermined angle with said first side of said light emitting panel, said second side of said liquid crystal panel engaging a said third stopper surface, whereby said liquid crystal panel is fixed at a predetermined position, and said second side of said light emitting panel engages a said fourth stopper surface, whereby said light emitting panel is fixed at a predetermined position, said stopper portions being diagonally located with respect to said liquid crystal panel.

2. A liquid crystal panel positioning device according to claim 1, wherein said first stopper surface is substantially perpendicular to said second stopper surface.

3. A liquid crystal panel positioning device according to claim 1, comprising a said stopper portion at each of at least four different positions of said positioning device, said liquid crystal panel and said light emitting panel crossing each other, so that said liquid crystal panel and said light emitting panel form at least four corners having said predetermined angle at said at least four different positions, and each of said at least four corners engaging a respective said stopper portion.

4. A liquid crystal panel positioning device according to claim 1, wherein said first stopper surface is substantially perpendicular to said third stopper surface, and said second stopper surface is substantially perpendicular to said fourth stopper surface.

5. A liquid crystal panel positioning device according to claim 1, wherein said liquid crystal panel only engages said first and third stopper surfaces, and said light emitting panel only engages said second and fourth stopper surfaces.

6. A liquid crystal panel positioning device according to claim 1, wherein at least one of said first, second, and third stopper surfaces extends upwardly beyond said fourth stopper surface.

* * * * *